United States Patent
Cao et al.

(10) Patent No.: US 10,430,518 B2
(45) Date of Patent: Oct. 1, 2019

(54) WORD VECTOR PROCESSING FOR FOREIGN LANGUAGES

(71) Applicant: Alibaba Group Holding Limited, George Town (KY)

(72) Inventors: Shaosheng Cao, Hangzhou (CN); Xiaolong Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 15/874,725

(22) Filed: Jan. 18, 2018

(65) Prior Publication Data

US 2018/0210876 A1    Jul. 26, 2018

(30) Foreign Application Priority Data

Jan. 22, 2017   (CN) .......................... 2017 1 0045459

(51) Int. Cl.
| | |
|---|---|
| *G06F 17/27* | (2006.01) |
| *G06N 20/00* | (2019.01) |
| *G06F 17/28* | (2006.01) |
| *G06N 3/08* | (2006.01) |

(52) U.S. Cl.
CPC ...... *G06F 17/2785* (2013.01); *G06F 17/2863* (2013.01); *G06N 3/084* (2013.01); *G06N 20/00* (2019.01)

(58) Field of Classification Search
CPC . G06F 17/2785; G06F 17/2863; G06N 20/00; G06N 3/084; G06N 99/005
See application file for complete search history.

(56) References Cited

U.S. PATENT DOCUMENTS

| | | | | |
|---|---|---|---|---|
| 5,577,135 | A | * | 11/1996 | Grajski .............. G06K 9/00422 382/187 |
| 9,213,746 | B2 | | 12/2015 | Lee et al. |
| 2014/0108389 | A1 | | 4/2014 | Lee et al. |
| 2017/0031899 | A1 | | 2/2017 | Lee et al. |
| 2017/0139899 | A1 | * | 5/2017 | Zhao ..................... G06F 16/313 |

FOREIGN PATENT DOCUMENTS

| | | |
|---|---|---|
| EP | 2717176 | 4/2014 |
| WO | 2012/165929 | 12/2012 |
| WO | 2015/145981 | 10/2015 |

OTHER PUBLICATIONS

Mikolov et al.; "Distributed Representations of Words and Phrases and their Compositionality"; Oct. 16, 2013; 9 pages.
Bojanowshi et al.; "Enriching Word Vectors with Subword Information"; Facebook AI Research; Jun. 19, 2017; 12 pages.

(Continued)

*Primary Examiner* — Angela A Armstrong
(74) *Attorney, Agent, or Firm* — Fish & Richardson P.C.

(57) ABSTRACT

A word vector processing method is provided. Word segmentation is performed on a corpus to obtain words, and n-gram strokes corresponding to the words are determined. Each n-gram stroke represents n successive strokes of a corresponding word. Word vectors of the words and stroke vectors of the n-gram strokes are initialized corresponding to the words. After performing the word segmentation, the n-gram strokes are determined, and the word vectors and stroke vectors are determined, training the word vectors and the stroke vectors.

21 Claims, 3 Drawing Sheets

(56) References Cited

OTHER PUBLICATIONS

Xu et al.; "Improve Chinese Word Embeddings by Exploiting Internal Structure"; Department of Computer Science, University of Science and Technology of China; Proceedings of NAACL-HLT 2016, pp. 1041-1050; San Diego, California, Jun. 12-17, 2016; 10 pages.

Yu, Jinxing et al.; "Joint Ernbeddings of Chinese Words, Characters, and Fine-grained Subcharacter Components"; Proceedings of the 2017 Conference on Empirical Methods in Natural Language Processing, Jan. 1, 2017; 6 pages.

Li,Yanran et al.; "Component-Enhanced Chinese Character Embeddings"; Proceedings of the 2015 Conference on Empirical Methods in Natural Language Processing, Jan. 1, 2015; 6 pages.

Shi, Xinlei et al.; "Radical Embedding:Delving Deeper to Chinese Radicals"; Proceedings of the 53rd Meeting of the Association for Computational Linguistics and the 7th International Joint Conference on Natural Language Processing, Jan. 1, 2015; 5 pages.

Li, Changliang et al.; "Structured Vectors for Chinese Word Representations"; International Journal of Machine Learning and Computing; Oct. 1, 2015; 4 pages.

Sim, Khe Chai; "A Multimodal Stroke-Based Predictive Input for Efficient Chinese Text Entry on Mobile Devices"; 2014 IEEE Spoken Language Technology Workshop; Dec. 7, 2014; 6 pages.

Cao, Shaosheng et al.; "Investigating Stroke-Level Information for Learning Chinese Word Embeddings"; Proceedings of the ISWC 2017 Posters & Demonstrations and Industry Tracks Co-Located with the 16th International Semantic Web Conference (ISWC 2017); Oct. 25, 2017; 4 pages.

Bojanowski, Piotr et al.; "Enriching Word Vectors with Subword Information"; Arxiv.org, Cornell University Library; Jul. 15, 2016; 7 pages.

International Search Report and Written Opinion issued by the International searching Authority issued in International Application No. PCT/US2018/014680 dated Apr. 23, 2018; 14 pages.

Second Written Opinion in International Application No. PCT/US2018/014680, dated Dec. 18, 2018, 9 pages.

International Preliminary Report on Patentability in International Application No. PCT/US2018/014680, dated Apr. 8, 2019, 22 pages.

* cited by examiner

US 10,430,518 B2

WORD VECTOR PROCESSING FOR FOREIGN LANGUAGES

This application claims priority to Chinese Patent Application No. 201710045459.7, filed on Jan. 22, 2017, which is incorporated by reference in its entirety.

BACKGROUND

The present application relates to the technical field of computer software technologies, and in particular, to word vector processing. Current natural language processing solutions mostly use a neural network-based architecture. An important basic technology in such an architecture is a word vector. The word vector is a vector for mapping a word to a fixed dimension and represents semantic information of the word. In conventional systems, common word vector generation algorithms are typically designed for English or romance languages such as French and Spanish. Algorithms such as GOOGLE's word vector algorithm, FACEBOOK's n-gram character algorithm, and MICROSOFT's deep neural network algorithm function well for English because of the structure and syntax of the English language. However, when such algorithms are applied to Chinese, word vectors that are generated from Chinese words provide poor results.

SUMMARY

The present disclosure describes techniques for word vector processing. Embodiments of the present application provide techniques for word vector processing that can be used for the Chinese language, and solving problems associated with conventional word vector generation algorithms used on the Chinese language.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, features of Chinese words can be represented more precisely by using n-gram strokes corresponding to the word. Second, accuracy of word vectors of Chinese words can be improved.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes techniques for word vector processing and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Techniques provided by the present application are applicable to word vectors of the Chinese language. However, the techniques can also apply to other languages similar to Chinese, for example, Japanese, which is a language that also uses strokes to make a single symbol or word.

Figure 1:
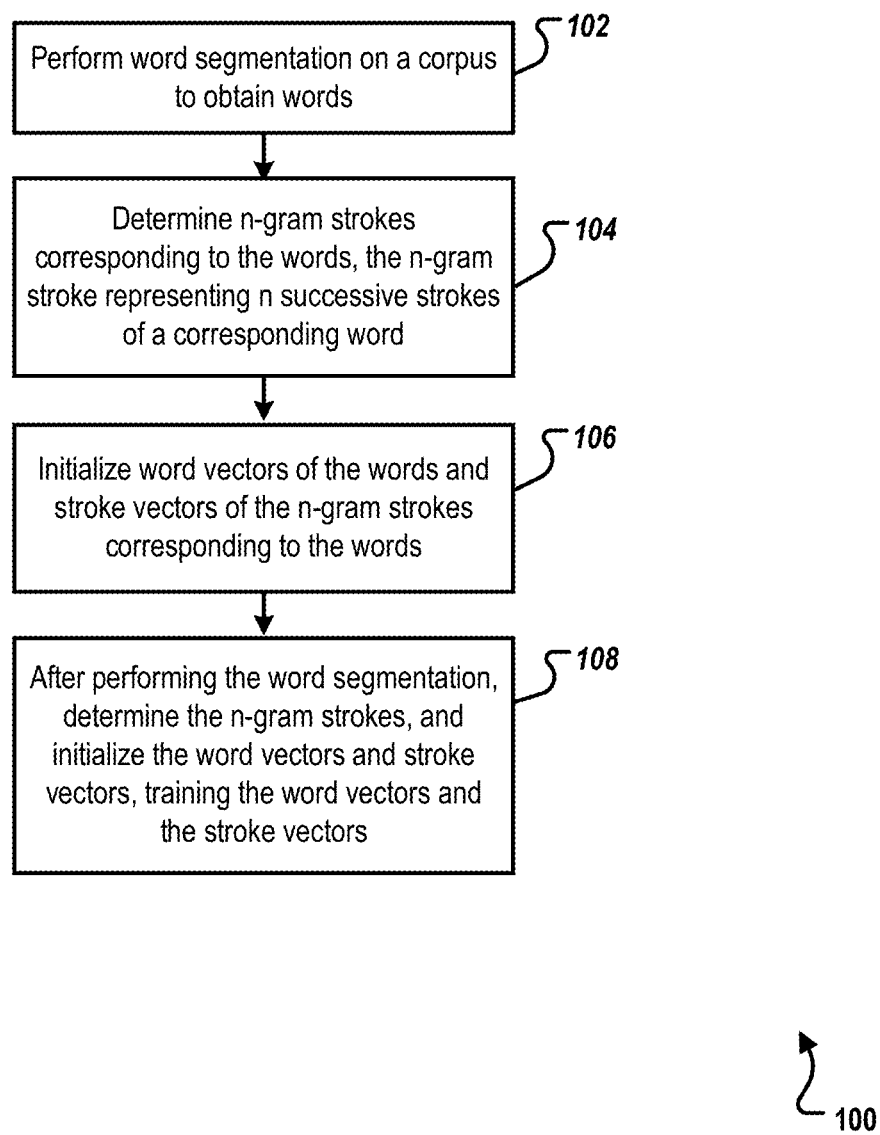
FIG. 1 is a flowchart illustrating an example of a computer-implemented method for word vector processing, according to an implementation of the present disclosure.

FIG. 1 is a flowchart illustrating an example of a computer-implemented method 100 for word vector processing, according to an implementation of the present disclosure. Method 100 can be executed by a program having a word vector generation function and/or a training function. From the device perspective, an entity executing the process can include, but is not limited to, the following devices that can include the program: a personal computer, a medium/large-scale computer, a computer cluster, a mobile phone, a tablet computer, an intelligent wearable device, a vehicle-mounted product, and the like. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, word segmentation is performed on a corpus to obtain words. For example, the words can be at least some of the words that occur at least once in the corpus. For ease of subsequent processing, the words can be stored in a glossary and can be read from the glossary when required. From 102, method 100 proceeds to 104.

At 104, n-gram strokes corresponding to the words are determined. Each n-gram stroke represents n successive strokes of a corresponding word. For ease of understanding, the "n-gram stroke" is further explained by using Chinese as an example. For a Chinese character or word, strokes can include "horizontal", "vertical", "throw away", "press down", "break", "dot", "rise", and the like. The n-gram stroke can represent n successive strokes of one Chinese character or word, such as used to make a single Chinese symbol.

For example, for the character "珍" (which is a Chinese character meaning treasure), corresponding 3-gram strokes include "horizontal, horizontal, and vertical" (the first stroke to the third stroke), "horizontal, vertical, and rise" (the second stroke to the fourth stroke), "vertical, rise, and throw away" (the third stroke to the fifth stroke), and so on. Corresponding 4-gram strokes are "horizontal, horizontal, vertical, and rise" (the first stroke to the fourth stroke), "horizontal, vertical, rise, and throw away" (the second stroke to the fifth stroke), and so on.

In another example, for the term A "大人" (which is a Chinese term meaning adult), corresponding 3-gram strokes include "horizontal, throw away, and press down" (the first stroke to the third stroke), "throw away, press down, and throw away" (the second stroke to the fourth stroke), and so on. Corresponding 4-gram strokes are "horizontal, throw away, press down, and throw away" (the first stroke to the fourth stroke), "throw away, press down, throw away, and press down" (the second stroke to the fifth stroke), and so on.

In some implementations, a value of n can be dynamically adjusted. For a same word, when determining n-gram strokes corresponding to the word, n may have only one value (for example, only 3-gram strokes corresponding to the word are determined). Alternatively, n can have multiple values, for example, 3-gram strokes and 4-gram strokes corresponding to the word can be determined. When the value of n is a specific value, then an n-gram stroke is probably a portion of the character. When the value of n is the total number of strokes of a character or a term, an n-gram stroke is exactly the character or the term.

In some implementations, for ease of computer processing, the type of the n-gram stroke can be indicated with a designated code. For example, different stroke types can be indicated by different numbers respectively. As a result, each n-gram stroke type can be represented as a corresponding numeric string. From 104, method 100 proceeds to 106.

At 106, word vectors of the words and stroke vectors of the n-gram strokes corresponding to the words are established and initialized. In some implementations, to assure consistent results, there can be some limitations as to when the word vectors and the stroke vectors are initialized. As an example, the limitations can dictate that it is not allowed to initialize the word vectors and the stroke vectors to identical vectors. In another example, values of vector elements of some word vectors or stroke vectors are not allowed to all equal 0.

In some implementations, the word vectors of the words and the stroke vectors of the n-gram strokes corresponding to the words can be initialized in a random initialization manner or in a manner of initializing according to a specified probability distribution. Stroke vectors of the same n-gram strokes can also be the same. The specified probability distribution can be, for example, a distribution within 0 to 1. In addition, word vectors and stroke vectors corresponding to some words can be already pre-trained on the basis of other corpora. Then, when the word vectors and the stroke vectors corresponding to these words are further trained on the basis of the corpus, the word vectors and the stroke vectors corresponding to these words cannot be established and initialized again. However, the word vectors and the stroke vectors can be retrained on the basis of the corpus and a previous training result. From 106, method 100 proceeds to 108.

At 108, the word vectors and the stroke vectors are trained according to the corpus. In some cases, the training can be based on the corpus different than a corpus upon which the word segmentation was performed. In some implementations, the training can be implemented by using a neural network. The neural network can include, but is not limited to, a shallow neural network and a deep neural network. After 108, method 100 stops.

By using method 100, features of a word can be shown more precisely by using n-gram strokes corresponding to the word. This can result in enhancing the accuracy of word vectors of Chinese words and can produce a more desirable and practical result.

In some implementations, determining n-gram strokes corresponding to the words can include the following steps. Words occurring at least once in the corpus can be determined according to a result of the word segmentation on the corpus. Then, for each determined word, n-gram strokes corresponding to the word can be determined, where each n-gram stroke corresponding to the word represents n successive strokes of the word, where n is a positive integer.

Further, if a word occurs only rarely in the corpus, then corresponding training samples and the number of trainings can also be limited during training based on the corpus, which can adversely affect the reliability of a training result. In some implementations, such words can be eliminated and are not trained temporarily, but the words can be trained subsequently in another corpus.

In some implementations, determining words occurring at least once in the corpus can include determining, according to the result of the word segmentation on the corpus, words that occur in the corpus for at least a set number of times. For example, the set number of times can be a value greater than 1. A specific value of the set number of times can be determined based on experience.

In some implementations, multiple specific training techniques can be used. For example, the training techniques can include a training technique based on context words or a training technique based on designated near-synonyms or synonyms. For ease of understanding, examples in the present disclosure apply to the training technique based on context words.

In some implementations, training the word vectors and the stroke vectors according to the corpus obtained after the word segmentation, the word vectors, and the stroke vectors can include the following. A designated word in the corpus obtained after the word segmentation is determined, and one or more context words of the designated word in the corpus are obtained after the word segmentation. A degree of similarity between the designated word and the context word is determined according to stroke vectors of n-gram strokes corresponding to the designated word as well as a word vector of the context word. The word vector of the context word and the stroke vectors of the n-gram strokes are updated corresponding to the designated word according to the degree of similarity between the designated word and the context word.

In some implementations, determining the degree of similarity can be done in other ways. For example, the degree of similarity can be calculated on the basis of a cosine operation on an angle between vectors, or on the basis of a quadratic sum operation on vectors, or in other ways.

There can be multiple designated words. The designated words can repeatedly occur in different positions of the corpus. The processing action described in the previous paragraph can be performed on each designated word. Generally, each word in the corpus obtained after the word segmentation can be used as a designated word.

In some implementations, the training in step 108 can increase the degree of similarity between the designated word and the context word. The degree of similarity can reflect a degree of association, where a degree of association between a word and its context word is relatively high. Further, context words corresponding to synonyms or near-synonyms can also have the same or similar meanings. Degrees of similarity between designated words and non-context words can be reduced. A non-context word can be used as a negative sample word, and a context word can be used as a positive sample word.

Some negative sample words can be determined for comparison in a training process. One or more words can be randomly selected as negative sample words from the corpus obtained after the word segmentation, or non-context words can be strictly selected as negative sample words. In some implementations, updating the word vector of the context word and the stroke vectors of the n-gram strokes corresponding to the designated word according to the degree of similarity between the designated word and the context word can include the following. One or more words are selected from the words as a negative sample word. A degree of similarity between the designated word and each negative sample word is determined. A loss characterization value corresponding to the designated word is determined according to a designated loss function, where the loss function is based on the degree of similarity between the designated word and the context word and the degree of similarity between the designated word and each negative sample word. The word vector of the context word and the stroke vectors of the n-gram strokes are updated corresponding to the designated word according to the loss characterization value.

The loss characterization value can be used to measure a degree of error between a current vector value and a training target. Several degrees of similarity can be used as parameters of the loss function.

In some implementations, updating of the word vector and the stroke vectors can actually be a modification to a degree of error. For example, when the solution of the present disclosure is implemented by using a neural network, such a modification can be implemented on the basis of counter propagation and gradient descent. For example, the gradient can be a gradient corresponding to the loss function.

In some implementations, updating the word vector of the context word and the stroke vectors of the n-gram strokes corresponding to the designated word according to the loss characterization value can include the following. A gradient corresponding to the loss function is determined according to the loss characterization value. The word vector of the context word and the stroke vectors of the n-gram strokes are updated correspondingly to the designated word according to the gradient.

In some implementations, the process of training the word vectors and the stroke vectors can be carried out iteratively. Iterations can occur, for example, on the basis of at least some words in the corpus being obtained after the word segmentation. As a result, the word vectors and the stroke vectors can gradually converge until the training is completed.

In some implementations, training on all words in the corpus obtained after the word segmentation can include the following. The corpus obtained after the word segmentation is traversed, and the following steps are performed on each word in the corpus obtained after the word segmentation. One or more context words of the word in the corpus obtained after the word segmentation are determined. For each context word, a degree of similarity between the word and the context word is determined according to stroke vectors of n-gram strokes corresponding to the word and a word vector of the context word. Then, the word vector of the context word and the stroke vectors of the n-gram strokes corresponding to the word are updated according to the degree of similarity between the word and the context word.

In some implementations, the traversing process can be implemented using a window, for example, in a user interface, along with interactions and inputs by a user. Determining one or more context words of the word in the corpus obtained after the word segmentation can include the following. Using the word as a center, a window can be established, for example, by sliding leftward and/or rightward by a distance. The distance can identify a designated number of words in the corpus obtained after the word segmentation, and words excluding this word in the window are determined as the context words of this word.

In some implementations, a window of a set length can be established by starting from the first word in the corpus obtained after the word segmentation. The window can include the first word and a set number of successive words following the first word. After the words in the window are processed, the window can be slid forward to process a next batch of words in the corpus until the corpus is completely traversed.

Figure 2:
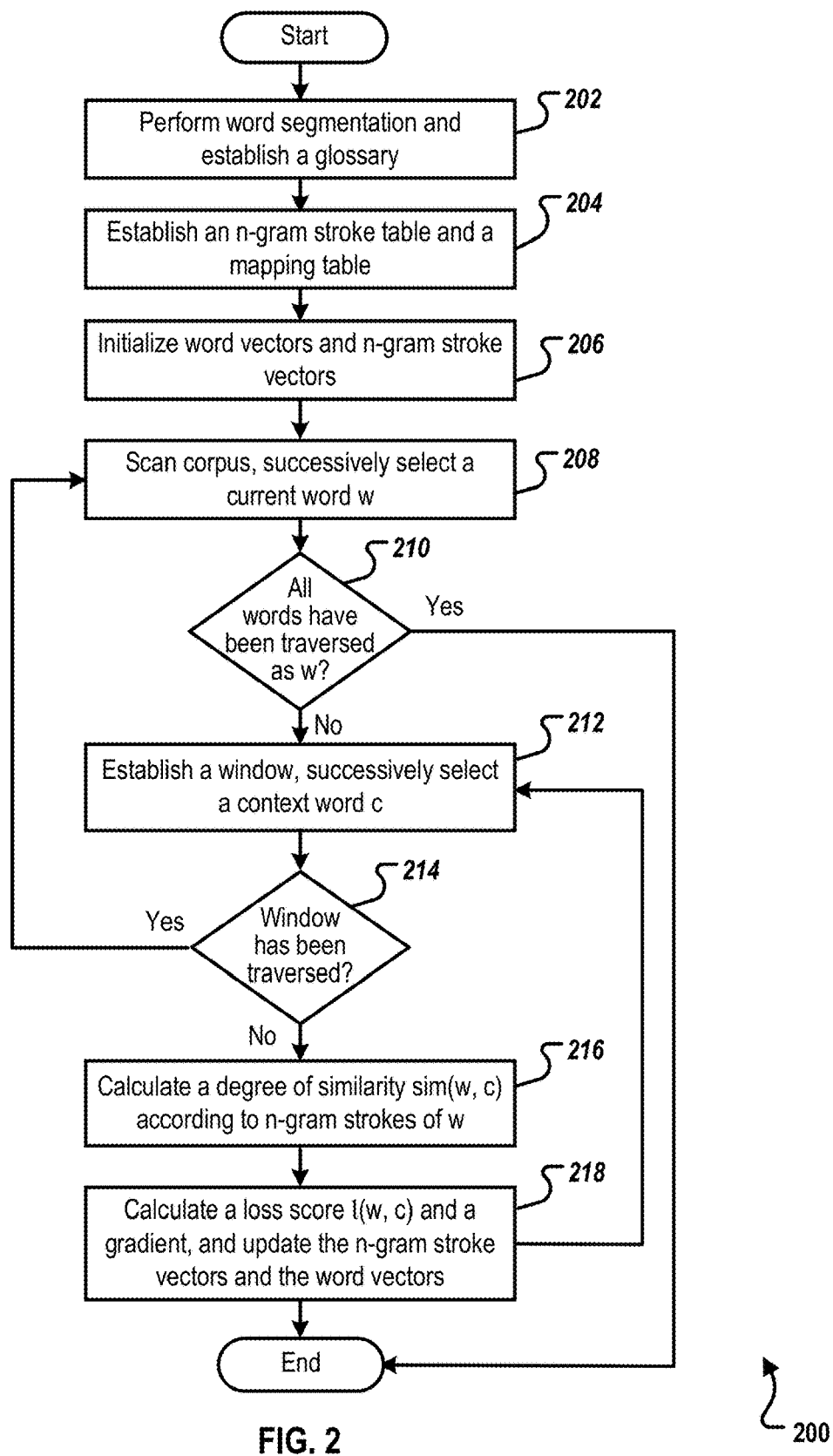
FIG. 2 is a flowchart illustrating an example of a computer-implemented method for word vector processing in an actual application scenario, according to an implementation of the present disclosure.

FIG. 2 is a flowchart illustrating an example of a computer-implemented method 200 for word vector processing in an actual application scenario, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, word segmentation is performed on a Chinese corpus with a word segmentation tool. A Chinese corpus is obtained after the word segmentation is scanned. All words that have occurred are counted to establish a glossary, and words that occur fewer than a threshold number of b times are deleted. From 202, method 200 proceeds to 204.

At 204, an n-gram stroke table and a mapping table are established. For example, the glossary is scanned one by one, and n-gram strokes corresponding to each word are extracted to establish an n-gram stroke table and a table that maps words and corresponding n-gram strokes. A total of five types of strokes can be defined, for example, including "horizontal", "vertical", "throw away", "press down", and "break." The strokes "hook", "dot", and "rise" can all be regarded as the "break" type. The five types of strokes can be indicated by numbers 1 to 5, respectively. From 204, method 200 proceeds to 206.

At 206, word vectors and n-gram stroke vectors are initialized. For example, a d-dimensional word vector can be established for each word in the glossary, and a d-dimensional stroke vector can be established for each n-gram stroke in the n-gram stroke table. All the established vectors can be randomly initialized. From 206, method 200 proceeds to 208.

At 208, the corpus is scanned, successively selecting a current word w. For example, the window can be used to slide over the words one-by-one, starting from the first word in the Chinese corpus obtained after the word segmentation. One word is selected each time as a "current word w" which is the designated word. From 208, method 200 proceeds to 210.

At 210, a determination is made as to whether all words have been traversed as w. If all the words in the whole corpus have been traversed as w, then method 200 ends. Otherwise, method 200 proceeds to 212.

At 212, a window is established, and a context word c is successively selected. For example, using the current word as a center, the window can be established by sliding towards two sides by a length of k words. One word can be selected as a "context word c" each time from the first word to the last word (excluding the current word w) in the window. From 212, method 200 proceeds to 214.

At 214, a determination is made as to whether all the words in the window have been traversed. If all the words in the window have been traversed as c, then method 200 returns to 208. Otherwise method 200 proceeds to 216.

At 216, a degree of similarity sim(w, c) is calculated according to n-gram strokes of w. For example, for the current word w, n-gram strokes corresponding to the current word w are searched for in the table of mapping words and corresponding n-gram strokes, and a degree of similarity between the current word w and the context word c is calculated by using the following Equation 1:

$$sim(w, c) = \sum_{q \in S(w)} \vec{q} \cdot \vec{c} \quad (1)$$

In Equation 1, S represents the n-gram stroke table established in step 204, S(w) represents a set of n-gram strokes corresponding to the current word w in the mapping table in step 204, q represents an element (that is, an n-gram stroke) in the set S(w), sim(w, c) represents a score of a degree of similarity between the current word w and the context word c, and $\vec{q} \cdot \vec{c}$ represents a vector dot product operation between the n-gram stroke q and the context word c. From 216, method 200 proceeds to 218.

At 218, a loss score l(w, c) and a gradient are calculated, and the n-gram stroke vectors and the word vectors are updated. For example, λ words can be randomly extracted as negative sample words, and a loss score l(w, c) can be calculated according to the following Equation 2:

$$l(w, c) = \log\sigma(sim(w, c)) + \sum_{i=1}^{\lambda} E_{c' \in p(V)}[\log\sigma(-sim(w, c'))] \quad (2)$$

In Equation 2, log represents a log function, c' represents randomly extracted negative sample words, $E_{c' \in p(V)}[x]$ represents an expected value of the expression x in the case where the randomly extracted negative sample words c' meet a probability distribution p(V), and σ(•) is an excitation function of a neural network, as given by Equation 3:

$$\sigma(x) = \frac{1}{1 + \exp(-x)} \quad (3)$$

In Equation 3, if x is a real number, then σ(x) is also a real number. A gradient can be calculated according to a value of l(w, c), and a vector $\vec{q}$ of an n-gram stroke and a vector $\vec{c}$ of a context word can be updated. From 218, method 200 returns to 212 to establish another window and successively select a context word c. Otherwise, after 218, method 200 stops.

Figure 3:
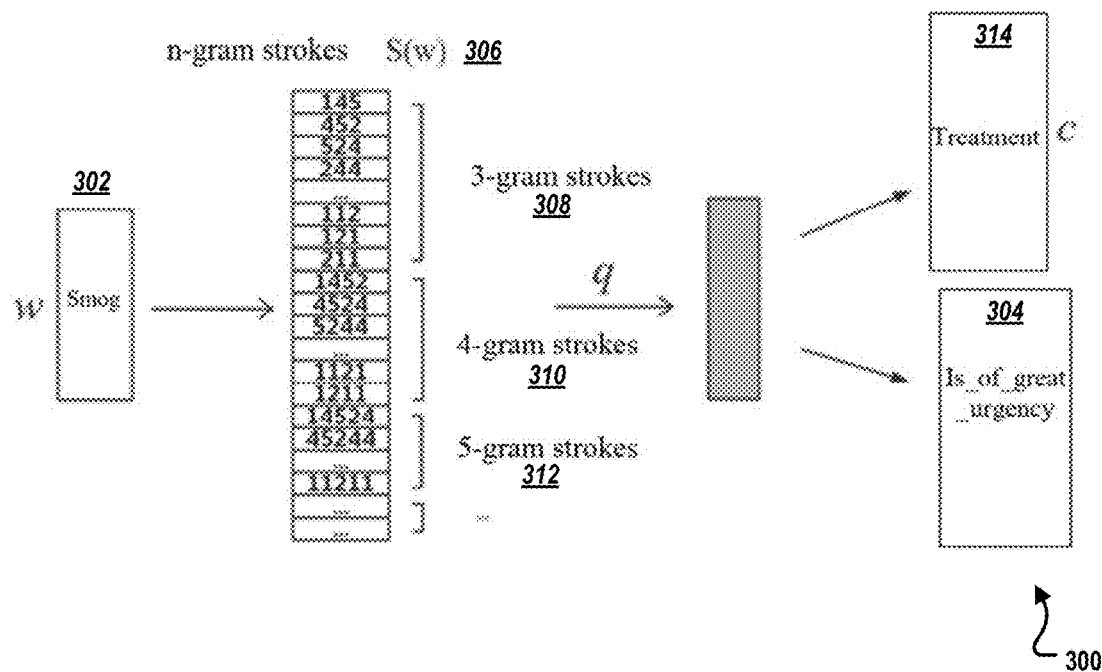
FIG. 3 is a schematic diagram of an example of a related processing action on a part of the corpus used in the process of FIG. 2, according to an implementation of the present disclosure.

FIG. 3 is a schematic diagram of an example of a related processing action 300 on a part of the corpus used in the process of FIG. 2, according to an implementation of the present disclosure. FIG. 3 provides detailed information associated with steps 216 and 218 of method 200.

As shown in FIG. 3, assuming that the corpus includes a sentence "治理雾霾刻不 容缓" (which means "smog treatment is of great urgency"). Three terms in the sentence including "治理" (which means "treatment"), "雾霾" (which means "smog" 302), and "刻不容缓" (which means "is_of_great_urgency" 304) can be obtained after the word segmentation.

Assume that "雾霾" is selected as a current word w and "治理" is selected as a context word c. All n-gram strokes S(w) 306 mapped by the current word w can be extracted. For example, 3-gram strokes 308 mapped by "雾霾" can include "145", "452", "524", and so on for 4-gram strokes 310 and 5-gram strokes 312. Then, a loss score l(w, c) can be calculated according to the Equations 1, 2, and 3, and a gradient can be calculated to update a word vector of c 314 and all stroke vectors corresponding to w.

Figure 4:
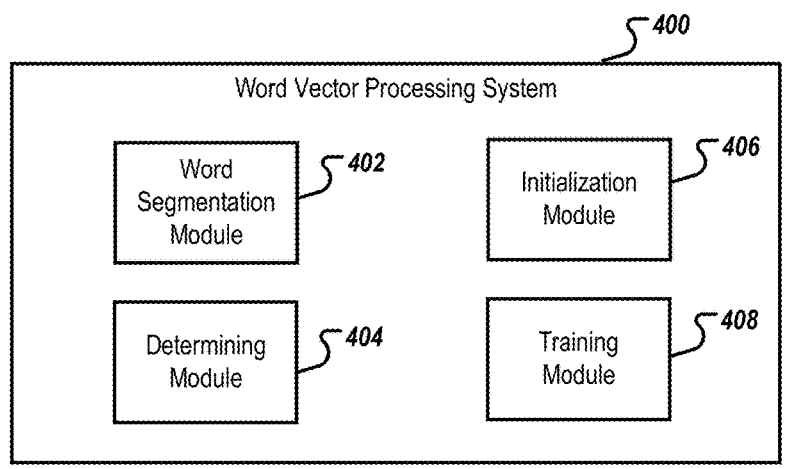
FIG. 4 is a block diagram of an example of a word vector processing system corresponding to FIG. 1, according to an implementation of the current disclosure.

FIG. 4 is a block diagram of an example of a word vector processing system 400 corresponding to FIG. 1, according to an implementation of the current disclosure. The word vector processing system 400 can be used, for example, to implement methods 100 and 200.

A word segmentation module 402 can be configured to perform word segmentation on a corpus to obtain words. A determining module 404 can be configured to determine n-gram strokes corresponding to the words, where the n-gram stroke represents n successive strokes of a corresponding word. An initialization module 406 can be configured to establish and initialize word vectors of the words and stroke vectors of the n-gram strokes corresponding to the words. A training module 408 can be configured to train the word vectors and the stroke vectors according to the corpus obtained after the word segmentation, the word vectors, and the stroke vectors.

In some implementations, the determining module 404 can determine n-gram strokes corresponding to the words using the following. The determining module 404 can determine words occurring at least once in the corpus according to a result of the word segmentation on the corpus. For each determined word, n-gram strokes corresponding to the word are determined, where each n-gram stroke corresponding to the word represents n successive strokes of the word, and n is a positive integer.

In some implementations, the determining module 404 can determine words occurring at least once in the corpus according to a result of the word segmentation. For example, the determining module 404 can include words that occur in the corpus for at least a set number of times equal to or greater than 1.

In some implementations, the initialization module 406 can initialize word vectors of the words and stroke vectors of the n-gram strokes corresponding to the words by initializing the word vectors of the words and the stroke vectors of the n-gram strokes corresponding to the words. Initialization can include random initialization or can occur according to a specified probability distribution. The stroke vectors of the same n-gram strokes can be the same.

In some implementations, the training module 408 can train the word vectors and the stroke vectors according to the corpus obtained after the word segmentation, the word vectors, and the stroke vectors using the following. The training module 408 can determine a designated word in the corpus obtained after the word segmentation and one or more context words of the designated word in the corpus obtained after the word segmentation. The training module 404 can determine a degree of similarity between the designated word and the context word according to stroke vectors of n-gram strokes corresponding to the designated word as well as a word vector of the context word. Then, the training module 408 can update the word vector of the context word and the stroke vectors of the n-gram strokes corresponding to the designated word according to the degree of similarity between the designated word and the context word.

In some implementations, the training module 408 can update the word vector of the context word and the stroke vectors of the n-gram strokes corresponding to the designated word according to the degree of similarity between the designated word and the context word. For example, the training module 408 can select one or more words from the words as a negative sample word and determine a degree of similarity between the designated word and each negative sample word. The training module 408 can then determine a loss characterization value corresponding to the designated word according to a designated loss function, the degree of similarity between the designated word and the context word, and the degree of similarity between the designated word and each negative sample word. Finally, the training module 408 can update the word vector of the context word and the stroke vectors of the n-gram strokes corresponding to the designated word according to the loss characterization value.

In some implementations, the training module 408 can update the word vector of the context word and the stroke vectors of the n-gram strokes corresponding to the designated word according to the loss characterization value. For example, the training module 408 can determine a gradient corresponding to the loss function according to the loss characterization value and update the word vector of the context word and the stroke vectors of the n-gram strokes corresponding to the designated word according to the gradient.

In some implementations, the training module 408 can select one or more words from the words as a negative sample word by randomly selecting one or more words from the words as the negative sample word. In some implementations, the training module 408 can train the word vectors and the stroke vectors according to the corpus obtained after the word segmentation, the word vectors, and the stroke vectors. For example, the training module 408 can traverse the corpus obtained after the word segmentation, and perform the following operation on each word in the corpus obtained after the word segmentation. One or more context words of the word in the corpus obtained after the word segmentation can be determined. For each context word, a degree of similarity between the word and the context word is determined according to stroke vectors of n-gram strokes corresponding to the word and a word vector of the context word. Then, the word vector of the context word and the stroke vectors of the n-gram strokes are updated corresponding to the word according to the degree of similarity between the word and the context word.

In some implementations, the training module 408 can determine one or more context words of the word in the corpus obtained after the word segmentation. For example, establishing a window, using this word as a center, can be done by sliding leftward and/or rightward by a distance representing a designated number of words in the corpus obtained after the word segmentation. Words excluding this word in the window can be determined as the context words of this word.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, that is, one or more modules of computer program instructions, encoded on non-transitory computer storage media for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple Compact Discs (CDs), Digital Video Discs (DVDs), magnetic disks, or other storage devices).

The operations described in this specification can be implemented as operations performed by a data processing apparatus on data stored on one or more computer-readable storage devices or received from other sources.

The terms "data processing apparatus," "computer," or "computing device" encompass all kinds of apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application specific integrated circuit (ASIC). The apparatus can also include, in addition to hardware, code that creates an execution environment for the computer program in question, for example, code that constitutes processor firmware, a protocol stack, a database management system, an operating system (for example, LINUX, UNIX, WINDOWS, MAC OS, ANDROID, IOS, another operating system, or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, software module, software unit, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile device, a personal digital assistant (PDA), a game console, a Global Positioning System (GPS) receiver, or a portable storage device (for example, a universal serial bus (USB) flash drive), to name just a few. Devices suitable for storing computer program instructions and data include all forms of non volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and CD ROM and DVD-ROM disks. The processor and the memory can be supplemented by, or incorporated in, special purpose logic circuitry.

Mobile devices can include mobile telephones (for example, smartphones), tablets, wearable devices (for example, smart watches, smart eyeglasses, smart fabric, smart jewelry), implanted devices within the human body (for example, biosensors, smart pacemakers, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors.

To provide for interaction with a user, embodiments of the subject matter described in this specification can be implemented on a computer having a display device, for example, a cathode ray tube (CRT) or liquid crystal display (LCD) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented using computing devices interconnected by any form or medium of wireline or wireless digital data communication (or combination thereof), for example, a communication network. Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Worldwide Interoperability for Microwave Access (WIMAX), Long Term Evolution (LTE), Code Division Multiple Access (CDMA), 5G protocols, IEEE 802.11a/b/g/n or 802.20 protocols (or a combination of 802.11x and 802.20 or other protocols consistent with the present disclosure), Internet Protocol (IP), Frame Relay, Asynchronous Transfer Mode (ATM), ETHERNET, or other protocols or combinations of protocols. The communication network can transmit voice, video, data, or other information between the connected computing devices.

Embodiments of the subject matter described in this specification can be implemented using clients and servers interconnected by a communication network. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A word vector processing method, comprising:
    performing word segmentation on a corpus to obtain words;
    determining n-gram strokes corresponding to the words, the n-gram stroke representing n successive strokes of a corresponding word;
    initializing word vectors of the words and stroke vectors of the n-gram strokes corresponding to the words; and
    after performing the word segmentation, determining the n-gram strokes, and initializing the word vectors and stroke vectors, training the word vectors and the stroke vectors,
    wherein the training the word vectors and the stroke vectors comprises:
        determining a designated word in the corpus, and one or more context words of the designated word in the corpus;
        determining a degree of similarity between the designated word and the context word according to stroke vectors of n-gram strokes corresponding to the designated word as well as a word vector of the context word;
        selecting one or more words from the words as a negative sample word;
        determining a degree of similarity between the designated word and each negative sample word;
        determining a loss characterization value corresponding to the designated word according to a designated loss function, the degree of similarity between the designated word and the context word, and the degree of similarity between the designated word and each negative sample word; and
        updating the word vector of the context word and the stroke vectors of the n-gram strokes corresponding to the designated word according to the loss characterization value.

2. The method of claim 1, wherein determining n-gram strokes corresponding to the words comprises:
    determining, according to a result of the word segmentation on the corpus, words occurring at least once in the corpus; and
    performing the following operation on each determined word:
        determining n-gram strokes corresponding to the word, wherein each n-gram stroke corresponding to the word represents n successive strokes of the word, and n is one positive integer or multiple different positive integers.

3. The method of claim 2, wherein determining, according to a result of the word segmentation on the corpus, words occurring at least once in the corpus specifically comprises:
    determining, according to the result of the word segmentation on the corpus, a word that occurs in the corpus for not less than a set number of times, the set number of times being not less than 1.

4. The method of claim 1, wherein initializing word vectors of the words and stroke vectors of the n-gram strokes corresponding to the words specifically comprises:
    initializing the word vectors of the words and the stroke vectors of the n-gram strokes corresponding to the words in a random initialization manner or in a manner of initializing according to a specified probability distribution, wherein stroke vectors of the same n-gram strokes are also the same.

5. The method of claim 1, wherein selecting one or more words from the words as a negative sample word specifically comprises:
    randomly selecting one or more words from the words as the negative sample word.

6. The method of claim 1, wherein the words are Chinese words, and the word vectors are word vectors of the Chinese words.

7. The method of claim 1, wherein updating the word vector of the context word and the stroke vectors of the n-gram strokes corresponding to the designated word according to the loss characterization value specifically comprises:
    determining a gradient corresponding to the loss function according to the loss characterization value; and
    updating the word vector of the context word and the stroke vectors of the n-gram strokes corresponding to the designated word according to the gradient.

8. A non-transitory, computer-readable medium storing one or more instructions executable by a computer system to perform operations comprising:
    performing word segmentation on a corpus to obtain words;
    determining n-gram strokes corresponding to the words, the n-gram stroke representing n successive strokes of a corresponding word;
    initializing word vectors of the words and stroke vectors of the n-gram strokes corresponding to the words; and
    after performing the word segmentation, determining the n-gram strokes, and initializing the word vectors and stroke vectors, training the word vectors and the stroke vector,
    wherein the training the word vectors and the stroke vectors comprises:
        determining a designated word in the corpus, and one or more context words of the designated word in the corpus;

determining a degree of similarity between the designated word and the context word according to stroke vectors of n-gram strokes corresponding to the designated word as well as a word vector of the context word;

selecting one or more words from the words as a negative sample word;

determining a degree of similarity between the designated word and each negative sample word;

determining a loss characterization value corresponding to the designated word according to a designated loss function, the degree of similarity between the designated word and the context word, and the degree of similarity between the designated word and each negative sample word; and updating the word vector of the context word and the stroke vectors of the n-gram strokes corresponding to the designated word according to the loss characterization value.

9. The non-transitory, computer-readable medium of claim 8, wherein determining n-gram strokes corresponding to the words comprises:

determining, according to a result of the word segmentation on the corpus, words occurring at least once in the corpus; and performing the following operation on each determined word:

determining n-gram strokes corresponding to the word, wherein each n-gram stroke corresponding to the word represents n successive strokes of the word, and n is one positive integer or multiple different positive integers.

10. The non-transitory, computer-readable medium of claim 9, wherein determining, according to a result of the word segmentation on the corpus, words occurring at least once in the corpus specifically comprises:

determining, according to the result of the word segmentation on the corpus, a word that occurs in the corpus for not less than a set number of times, the set number of times being not less than 1.

11. The non-transitory, computer-readable medium of claim 8, wherein initializing word vectors of the words and stroke vectors of the n-gram strokes corresponding to the words specifically comprises:

initializing the word vectors of the words and the stroke vectors of the n-gram strokes corresponding to the words in a random initialization manner or in a manner of initializing according to a specified probability distribution, wherein stroke vectors of the same n-gram strokes are also the same.

12. The non-transitory, computer-readable medium of claim 8, wherein determining n-gram strokes corresponding to the words comprises:

determining, according to a result of the word segmentation on the corpus, words occurring at least once in the corpus; and performing the following operation on each determined word:

determining n-gram strokes corresponding to the word, wherein each n-gram stroke corresponding to the word represents n successive strokes of the word, and n is one positive integer or multiple different positive integers.

13. The non-transitory, computer-readable medium of claim 8, wherein updating the word vector of the context word and the stroke vectors of the n-gram strokes corresponding to the designated word according to the loss characterization value specifically comprises:

determining a gradient corresponding to the loss function according to the loss characterization value; and updating the word vector of the context word and the stroke vectors of the n-gram strokes corresponding to the designated word according to the gradient.

14. The non-transitory, computer-readable medium of claim 8, wherein selecting one or more words from the words as a negative sample word specifically comprises:

randomly selecting one or more words from the words as the negative sample word.

15. The non-transitory, computer-readable medium of claim 8, wherein the words are Chinese words, and the word vectors are word vectors of the Chinese words.

16. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

performing word segmentation on a corpus to obtain words;

determining n-gram strokes corresponding to the words, the n-gram stroke representing n successive strokes of a corresponding word;

initializing word vectors of the words and stroke vectors of the n-gram strokes corresponding to the words; and after performing the word segmentation, determining the n-gram strokes, and initializing the word vectors and stroke vectors, training the word vectors and the stroke vector, wherein the training the word vectors and the stroke vectors comprises determining a designated word in the corpus, and one or more context words of the designated word in the corpus;

determining a degree of similarity between the designated word and the context word according to stroke vectors of n-gram strokes corresponding to the designated word as well as a word vector of the context word;

selecting one or more words from the words as a negative sample word;

determining a degree of similarity between the designated word and each negative sample word;

determining a loss characterization value corresponding to the designated word according to a designated loss function, the degree of similarity between the designated word and the context word, and the degree of similarity between the designated word and each negative sample word; and updating the word vector of the context word and the stroke vectors of the n-gram strokes corresponding to the designated word according to the loss characterization value.

17. The computer-implemented system of claim 16, wherein determining, according to a result of the word segmentation on the corpus, words occurring at least once in the corpus specifically comprises:

determining, according to the result of the word segmentation on the corpus, a word that occurs in the corpus for not less than a set number of times, the set number of times being not less than 1.

18. The computer-implemented system of claim 17, wherein initializing word vectors of the words and stroke vectors of the n-gram strokes corresponding to the words specifically comprises:

initializing the word vectors of the words and the stroke vectors of the n-gram strokes corresponding to the words in a random initialization manner or in a manner of initializing according to a specified probability distribution, wherein stroke vectors of the same n-gram strokes are also the same.

19. The computer-implemented system of claim 16, wherein updating the word vector of the context word and the stroke vectors of the n-gram strokes corresponding to the designated word according to the loss characterization value specifically comprises:

determining a gradient corresponding to the loss function according to the loss characterization value; and updating the word vector of the context word and the stroke vectors of the n-gram strokes corresponding to the designated word according to the gradient.

20. The computer-implemented system of claim 16, wherein selecting one or more words from the words as a negative sample word specifically comprises:

randomly selecting one or more words from the words as the negative sample word.

21. The computer-implemented system of claim 16, wherein the words are Chinese words, and the word vectors are word vectors of the Chinese words.

* * * * *